United States Patent
Abel

(10) Patent No.: US 12,240,579 B1
(45) Date of Patent: Mar. 4, 2025

(54) METHOD AND SYSTEM FOR SURF WAKE SHAPING

(71) Applicant: Villach Electric, LLC, Orlando, FL (US)

(72) Inventor: Dustin Abel, Bell Isle, FL (US)

(73) Assignee: VILLACH ELECTRIC, LLC, Orlando, FL (US)

( * ) Notice: Subject to any disclaimer, the term of this patent is extended or adjusted under 35 U.S.C. 154(b) by 455 days.

(21) Appl. No.: 17/544,241

(22) Filed: Dec. 7, 2021

Related U.S. Application Data

(60) Provisional application No. 63/122,245, filed on Dec. 7, 2020.

(51) Int. Cl.
| | |
|---|---|
| G06F 17/00 | (2019.01) |
| B63B 79/10 | (2020.01) |
| B63B 79/40 | (2020.01) |
| B63H 21/17 | (2006.01) |
| B63H 21/21 | (2006.01) |
| B63H 25/38 | (2006.01) |
| G05D 1/00 | (2006.01) |

(52) U.S. Cl.
CPC .......... B63H 21/21 (2013.01); B63B 79/10 (2020.01); B63B 79/40 (2020.01); B63H 21/17 (2013.01); B63H 25/38 (2013.01); G05D 1/0206 (2013.01); *B63H 2021/216* (2013.01)

(58) Field of Classification Search
CPC ........ B63H 21/21; B63H 21/17; B63H 25/38; B63H 2021/216; B63B 79/10; B63B 79/40; G05D 1/0206
USPC .......................................................... 701/21
See application file for complete search history.

(56) References Cited

U.S. PATENT DOCUMENTS

| | | | | | |
|---|---|---|---|---|---|
| 2,242,642 | A | * | 5/1941 | Bogert | B63H 1/14 440/87 |
| 2,350,942 | A | * | 6/1944 | Tarn | B63H 5/10 416/198 R |
| 3,709,187 | A | * | 1/1973 | Marco | B63H 3/04 416/185 |
| 3,922,997 | A | * | 12/1975 | Jameson | B63H 23/08 440/86 |
| 4,363,630 | A | * | 12/1982 | Di Vigano | B63H 5/16 114/57 |
| 4,428,734 | A | * | 1/1984 | Ludlow | B63H 23/06 440/83 |
| 5,704,308 | A | * | 1/1998 | Anderson | B63H 20/007 440/6 |

(Continued)

OTHER PUBLICATIONS

The Beginner's Guide to Wakesurfing (Year: 2024).*

(Continued)

*Primary Examiner* — Ronnie M Mancho
(74) *Attorney, Agent, or Firm* — Allen, Dyer, Doppelt + Gilchrist, PA

(57) ABSTRACT

A rotational speed differential is set between port and starboard propellers of a watersports boat to induce yaw towards a desired side for surfing. Counter-steer is applied to counteract the induced yaw, resulting in improved wake characteristics. A controller is configured to automatically operate port and starboard drives to set the rotational speed differential upon receipt of a command to enter a surf mode from a user interface, as well as a selection of the side to be surfed.

20 Claims, 2 Drawing Sheets

(56) References Cited

U.S. PATENT DOCUMENTS

| | | | | |
|---|---|---|---|---|
| 6,032,087 | A * | 2/2000 | Yamamoto | G05D 1/0206 |
| | | | | 701/1 |
| 6,823,812 | B2 * | 11/2004 | von Wolske | B63H 20/106 |
| | | | | 114/286 |
| 6,978,729 | B2 * | 12/2005 | Bertetti | G01S 15/93 |
| | | | | 114/151 |
| 7,316,595 | B2 * | 1/2008 | von Wolske | B63H 5/00 |
| | | | | 440/62 |
| 8,327,728 | B2 * | 12/2012 | Carlson | G01C 19/06 |
| | | | | 74/5.37 |
| 9,457,885 | B2 * | 10/2016 | Guglielmo | B63H 21/24 |
| 10,683,075 | B2 * | 6/2020 | Schibli | B63B 34/20 |
| 2005/0070180 | A1 * | 3/2005 | von Wolske | B63H 20/34 |
| | | | | 440/55 |
| 2005/0075016 | A1 * | 4/2005 | Bertetti | B63H 25/42 |
| | | | | 440/84 |
| 2007/0006516 | A1 * | 1/2007 | LaCroix, Jr. | A01M 31/00 |
| | | | | 43/26.1 |
| 2010/0000350 | A1 * | 1/2010 | Carlson | G01C 19/06 |
| | | | | 74/5.22 |
| 2013/0199433 | A1 | 8/2013 | Lochtefeld | |
| 2013/0220193 | A1 | 8/2013 | Viviani et al. | |
| 2014/0083346 | A1 | 3/2014 | Viviani et al. | |
| 2014/0261135 | A1 | 9/2014 | Gasper et al. | |
| 2015/0197314 | A1 * | 7/2015 | Gasper | B63H 25/06 |
| | | | | 114/284 |
| 2017/0029072 | A1 * | 2/2017 | Gasper | G08B 21/084 |
| 2017/0038771 | A1 * | 2/2017 | Green | G05D 1/0033 |
| 2017/0233038 | A1 | 8/2017 | Clover et al. | |
| 2017/0274967 | A1 * | 9/2017 | Morgan | B63B 34/70 |
| 2018/0284762 | A1 | 10/2018 | Green et al. | |
| 2018/0297667 | A1 | 10/2018 | Gasper et al. | |
| 2020/0064828 | A1 | 2/2020 | Green et al. | |

OTHER PUBLICATIONS

The Beginner's Guide to Wakesurfing (Year: 2024) (Year: 2024).*
The Beginner's Guide to Wakesurfing (Year: 2024) (Year: 2024) (Year: 2024).*

* cited by examiner

METHOD AND SYSTEM FOR SURF WAKE SHAPING

CROSS-REFERENCE TO RELATED APPLICATION

This application claims the benefit of U.S. Provisional Application Ser. No. 63/122,245, filed Dec. 7, 2021, the contents of which are herein incorporated by reference in their entirety.

FIELD OF THE INVENTION

The present invention relates to improving the wake behind a watersports boat for wake surfing, and more particular, to methods of operating a watersports boat for improving surf wake shape.

BACKGROUND OF THE INVENTION

The sport of wake surfing, where an individual rides the wake of a boat in a manner similar to wave surfing, has increased greatly in popularity over the past several years. Together with this increase in popularity has been a corresponding increase in technologies developed to improve the size and shape of the boat wake to make it better for surfing—and for which the generally symmetrical, unmodified wake of most watersports boats is not optimal.

One example of such technologies includes ballasting systems to weigh down the stern of the boat, and particularly to weight one side down more than the other. Another example includes stern mounted plates that are extended on the side of the boat opposite the wake to be surfed, which also help improve wake shape. Although these technologies are very effective, they have some disadvantages—most notably the need to mount extra mechanical equipment on the boat. Additionally, systems involving hardware extended into the boat's wake are typically subject to speed limits to avoid damage.

SUMMARY OF THE INVENTION

In view of the foregoing, it is the object of the present invention to provide a new method for wake shaping and related system. According to an embodiment of the present invention, a method of wake shaping includes receiving a command, at a controller, to enter a surf mode, and automatically operating a propulsion system to set a predetermined rotational speed differential between port and starboard propellers.

According to another aspect, a method of wake shaping includes commanding a controller to enter surf mode and steering to counteract the effect of a rotational speed differential between port and starboard propellers set by the controller.

According to a further aspect, a watersports boat with a system for wake shaping includes a propulsion system with port and starboard propellers and a controller configured with program instructions to automatically operate the propulsion system to set a predetermined rotational speed differential between the port and starboard propellers upon receiving a command to enter a surf mode.

These and other objects, aspects and advantages of the present invention will be better appreciated in view of the drawings and following detailed description of preferred embodiments.

DETAILED DESCRIPTION OF PREFERRED EMBODIMENTS

Figure 1:
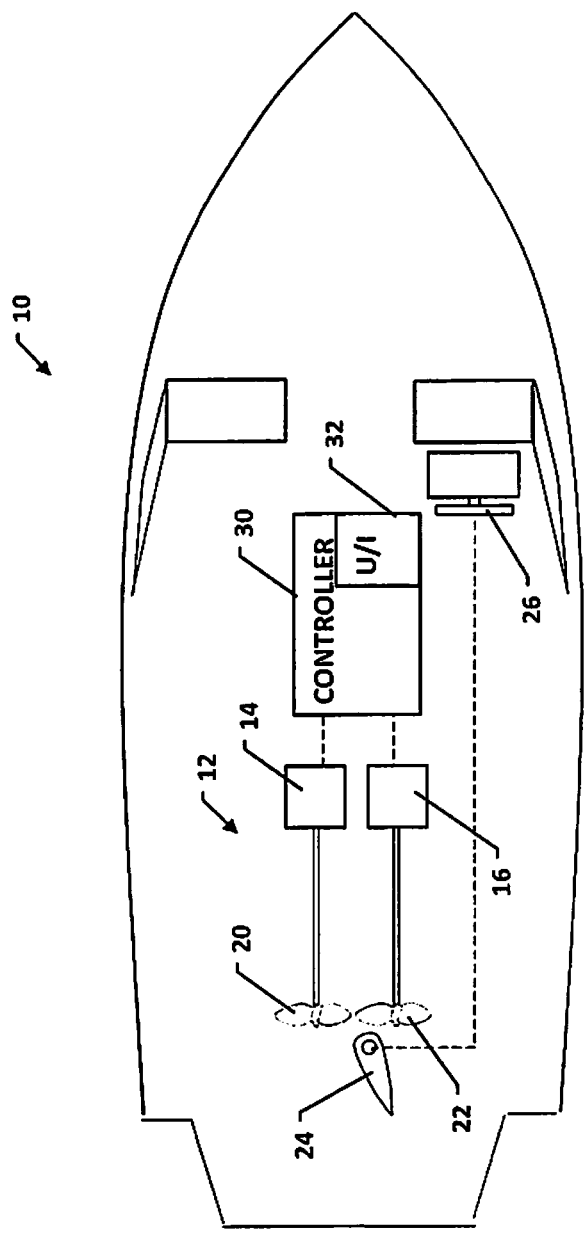
FIG. 1 is a schematic overview of watersports boat having a system for wake shaping, according to an embodiment of the present invention.

According to an embodiment of the present invention, referring to FIG. 1, a watersports boat 10 includes a propulsion system 12 having port and starboard drives 14, 16 which turn port and starboard propellers 20, 22. A rudder 24 is operable to impart a turning motion to the boat 10 and is operable from a helm 26. A controller 30 is configured with program instructions to automatically operate the drives 14, 16 so as to impart a rotational speed differential to the propellers 20, 22 after receiving a command to enter a surf mode from a user interface 32.

The drives 14, 16 can be of any suitable type, such as electric, gasoline or diesel motors, provided they can be controlled independently to establish the predetermined speed differential. The controller 30 can be any sort of microprocessor device including machine-readable memory for storing the program instructions. The user interface 32 could be a simple mechanical interface, such as one or more switches, knobs or pushbuttons, or an electronic interface such as a touch screen display. In addition to allowing input of the surf mode command, the user interface 32 preferably also allows the operator to select a side for surfing. It will be appreciated that the command to enter the surf mode need not be labeled as such.

By establishing a rotational speed differential between the propellers 20, 22, the controller 30 induces yaw, which the operator counteracts with the rudder 24 via the helm in order to maintain the desired heading of the boat 10. The resulting oblique motion of the boat 10 through the water disrupts the symmetry of the wake and forms a better surfing wake 34 on the side toward which the operator counter-steers, which is also the side of the higher speed propeller, which in the depicted embodiment in the starboard propeller 22. It will be appreciated that the better surfing wake could readily be generated on the other side (e.g., in response to the operator selection of a side) simply by setting the speed differential such that the higher speed propeller in the port side propeller 20—which would result in a counter-steer toward port to maintain the desired heading.

It will also be appreciated that the desired rotational speed differential could be achieved by slowing one propeller, speeding up the other propeller or a combination of both. The optimal speed differential can readily be determined experimentally for a given watersports boat. A differential of less than 20 revolutions per minute (RPM) is preferred, while a range of 5 RPM to 15 RPM is more preferred—with approximately 10 RPM being suitable for most surfing applications. Optionally, the magnitude of the differential can be operator selectable via the user interface.

Figure 2:
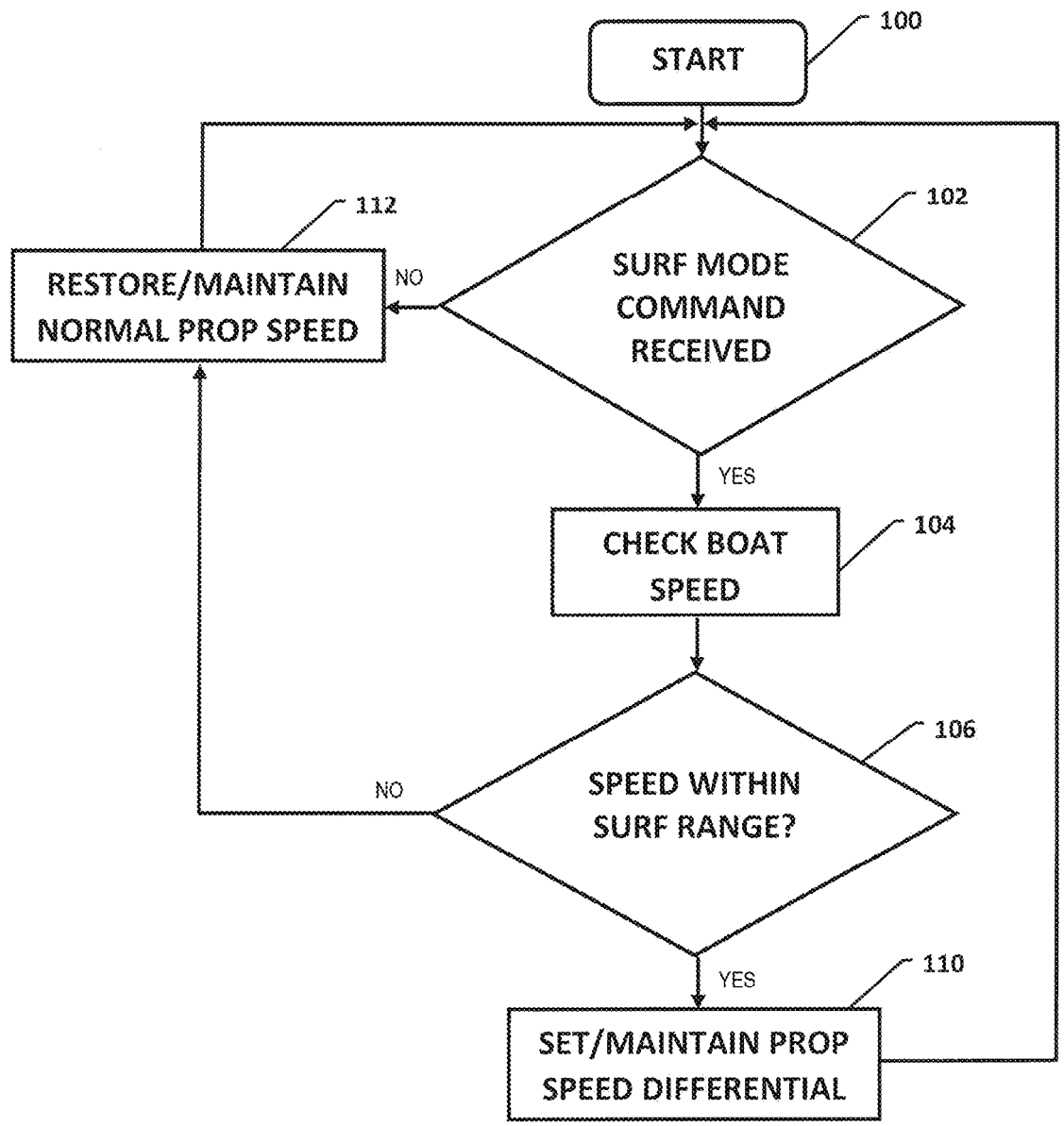
FIG. 2 is a flow diagram of a method for wake shaping executed using the system of FIG. 1.

Referring to FIG. 2, a method of operation using the system 12 starts at block 100. At block 102, the controller 30 determines whether a command to enter surf mode has been received, which preferably also includes a selection of a side to be surfed. If the command has been received, the controller 30 checks boat speed (e.g., based on propeller speed, a water speed sensor, positioning system input, etc.) at block 104.

At block 106, the controller 30 determines whether the boat speed ascertained at block 104 is within an acceptable range. For instance, the controller 30 could be configured with lower and/or upper bounds on acceptable speeds for implementing the surf mode command. A speed range suitable for surfing could be at least 10 miles per hour (MPH) with an upper bound of 20 MPH. Since no hardware is being extended into the water from the boat, it is not necessary to limit the upper end of the speed range to avoid damage. It may still be desirable, however, to set some upper bound for other reasons.

If the speed is determined to be within the acceptable range at block 106, then the controller 30 automatically operates one or both drives 14, 16 to set the predetermined propeller speed differential at block 110. As described above, this induces yaw, which the operator counter-steers to correct, generating the wake-shaping oblique motion of the boat 10. The method then repeats, with the speed differential being maintained unless the surf mode command is no longer received at block 102 or if the boat speed is no longer within the acceptable range at block 106. In either of these cases, the controller 30 restores the normal propeller speed(s) at block 112.

Advantageously, a wake shaping system and method according to the present invention can be implemented on any boat having two or more propellers by simply providing and/or configuring a controller and user interface to operate the propellers in the manner described. No additional mechanical structures need to be added to the watersports boat. However, the system and method of the present invention could still be practiced on boats having such structures, such as ballast tanks and deployable stern plates.

The above-described embodiments are provided for illustrative purposes, the present invention is not necessarily limited thereto. Rather, those skilled in the art will appreciate that various modifications, as well as adaptations to particular circumstances, will fall within the scope of the invention herein shown and described and of the claims appended hereto.

What is claimed is:

1. A watersports boat comprising:
   port and starboard drives;
   port and starboard propellers turned by the port and starboard drives;
   a rudder operable to impart a turning motion to the boat;
   a user interface operable to receive a surf mode command; and
   a controller in communication with the user interface and the port and starboard drives and configured with machine-readable program instructions to, responsive to the surf mode command,
       determine whether a speed of the watersports boat is within a speed range, and
       if the speed of the watersports boat is within the speed range, impart a rotational speed differential to the port and starboard propellers.

2. The watersports boat of claim 1, wherein the user interface is further operable to receive a selection of a side of the watersports boat to be surfed, and the controller is further configured with machine-readable program instructions to set the rotational speed differential of the port and starboard propellers so that a surf wake is generated behind the watersports boat on the selected side.

3. The watersports boat of claim 1, wherein a magnitude of the rotational speed differential is no more than 20 revolutions per minute (RPM).

4. The watersports boat of claim 3, wherein the magnitude of the rotational speed differential is between 5 RPM to 15 RPM.

5. The watersports boat of claim 4, wherein the magnitude of the rotational speed differential is 10 RPM.

6. The watersports boat of claim 1, wherein the user interface is operable to receive a selection of a magnitude of the rotational speed differential, and the controller is further configured with machine-readable program instructions to set the rotational speed differential based on the selection of the magnitude received from the user interface.

7. The watersports boat of claim 1, wherein the speed range has a lower limit of 10 miles per hour (MPH).

8. The watersports boat of claim 1, wherein the speed range has an upper limit of 20 MPH.

9. The watersports boat of claim 1, wherein the controller is further configured with machine-executable program instructions to restore prior rotational speeds of the port and starboard propellers if the boat speed falls outside of the speed range.

10. The watersports boat of claim 1, wherein the port and starboard drives are electric drives.

11. A method for operating a watersports boat comprising port and starboard drives, a user interface, and a controller in communication with the user interface and the port and starboard drives, the method comprising:
    receiving a surf mode command at the controller via the user interface; and
    responsive to the surf mode command, at the controller,
        determining whether a speed of the watersports boat is within a speed range, and
        if the speed of the watersports boat is within the speed range, imparting a rotational speed differential to the port and starboard propellers.

12. The method of claim 11 further comprising, at the controller:
    receiving a selection of a side of the watersports boat to be surfed via the user interface; and
    setting the rotational speed differential of the port and starboard propellers so that a surf wake is generated behind the watersports boat on the selected side.

13. The method of claim 11, wherein a magnitude of the rotational speed differential is no more than 20 revolutions per minute (RPM).

14. The method of claim 13, wherein the magnitude of the rotational speed differential is between 5 RPM to 15 RPM.

15. The method of claim 14, wherein the magnitude of the rotational speed differential is 10 RPM.

16. The method of claim 11 further comprising, at the controller:
    receiving a selection of a magnitude of the rotational speed differential via the user interface; and
    setting the rotational speed differential based on the selection of the magnitude received from the user interface.

17. The method of claim 11, wherein the speed range has a lower limit of 10 miles per hour (MPH).

18. The method of claim 11, wherein the speed range has an upper limit of 20 MPH.

19. The method of claim 11 further comprising, at the controller, restoring prior rotational speeds of the port and starboard propellers if the boat speed falls outside of the speed range.

20. The method of claim 11, wherein the port and starboard drives are electric drives.

* * * * *